US010069709B2

(12) United States Patent
Ogawa et al.

(10) Patent No.: US 10,069,709 B2
(45) Date of Patent: Sep. 4, 2018

(54) COMMUNICATION APPARATUS AND VEHICLE TRANSMISSION SYSTEM

(71) Applicant: MITSUBISHI ELECTRIC CORPORATION, Chiyoda-ku, Tokyo (JP)

(72) Inventors: Yuji Ogawa, Tokyo (JP); Joji Ido, Tokyo (JP); Shogo Tatsumi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 296 days.

(21) Appl. No.: 14/764,384

(22) PCT Filed: May 17, 2013

(86) PCT No.: PCT/JP2013/063801
§ 371 (c)(1),
(2) Date: Jul. 29, 2015

(87) PCT Pub. No.: WO2014/184952
PCT Pub. Date: Nov. 20, 2014

(65) Prior Publication Data
US 2015/0381458 A1    Dec. 31, 2015

(51) Int. Cl.
*H04L 12/26* (2006.01)
*H04L 12/40* (2006.01)
(Continued)

(52) U.S. Cl.
CPC ........ *H04L 43/10* (2013.01); *H04L 12/40202* (2013.01); *H04L 12/413* (2013.01);
(Continued)

(58) Field of Classification Search
CPC ......... H04L 43/10; H04L 45/28; H04L 69/40; H04L 41/12; H04L 49/351; H04L 41/0659; H04L 41/0663
See application file for complete search history.

(56) References Cited

U.S. PATENT DOCUMENTS 8,004,965 B2    8/2011  Karino et al.
8,929,833 B2    1/2015  Naruse et al.
(Continued)

FOREIGN PATENT DOCUMENTS

JP    2003-143193 A    5/2003
JP    2003-348136 A    12/2003
(Continued)

OTHER PUBLICATIONS

International Search Report (PCT/ISA/210) dated Jul. 2, 2013, by the Japanese Patent Office as the International Searching Authority for International Application No. PCT/JP2013/063801.
(Continued)

*Primary Examiner* — Curtis A Alia
(74) *Attorney, Agent, or Firm* — Buchanan Ingersoll & Rooney PC (57) ABSTRACT

A communication apparatus that forms, in a train in which fixed formations are coupled, a backbone network relaying signals between branch networks formed in the fixed formations with another communication apparatus that is made redundant, includes: a VRRP functional unit that, when operating as a master, periodically transmits an alive monitoring frame to another communication apparatus operating as a backup via the branch network, and, when operating as a backup, receives an alive monitoring frame transmitted from another communication apparatus operating as a master via the branch network; a port-malfunction detection unit detecting malfunction of the port to which the branch network is connected; and an alive determination unit that,
(Continued)

when operating as a backup, detects whether another communication apparatus operating as a master has malfunctioned based on an alive-monitoring-frame reception result from the VRRP functional unit and a malfunction detection result from the port-malfunction detection unit.

6 Claims, 7 Drawing Sheets (51) Int. Cl.
*H04L 12/413* (2006.01)
*H04L 29/08* (2006.01)

(52) U.S. Cl.
CPC .......... *H04L 43/0817* (2013.01); *H04L 67/12* (2013.01); *H04L 2012/40293* (2013.01)

(56) References Cited

U.S. PATENT DOCUMENTS

| | | |
|---|---|---|
| 2004/0008694 A1 | 1/2004 | Guo |
| 2007/0061056 A1* | 3/2007 | Valsorda ............. B61L 15/0036 701/20 |
| 2014/0280792 A1* | 9/2014 | Sigoure ................... H04L 67/28 709/220 |

FOREIGN PATENT DOCUMENTS

| | | |
|---|---|---|
| JP | 2004-032758 A | 1/2004 |
| JP | 2005-130049 A | 5/2005 |
| JP | 2007-312091 A | 11/2007 |
| JP | 2008-015722 A | 1/2008 |
| JP | 2011-055416 A | 3/2011 |
| JP | 2013-085085 A | 5/2013 |
| WO | WO 2006/035575 A1 | 4/2006 |

OTHER PUBLICATIONS

Written Opinion (PCT/ISA/237) dated Jul. 2, 2013, by the Japanese Patent Office as the International Searching Authority for International Application No. PCT/JP2013/063801.

Office Action (Notice of Rejection) dated May 26, 2015, by the Japanese Patent Office in corresponding Japanese Patent Application No. 2015-515056 and an English Translation of the Office Action.

International Electrotechnical Commission, IEC, "Electronic railway equipment—Train communication network (TCN)—Part 2-5: Ethernet train backbone", 2014, IEC 63175-2-5, pp. 1-122.

* cited by examiner

| ECN PORT | MALFUNC-TIONED | NORMAL | NORMAL |
|---|---|---|---|
| VRRP ADVERTISEMENT RECEPTION | - | × | ○ |
| ALIVE DETERMINATION OF ETBN MASTER | ALIVE (NORMAL) | DEAD (MALFUNC-TIONED) | ALIVE (NORMAL) |

COMMUNICATION APPARATUS AND VEHICLE TRANSMISSION SYSTEM

FIELD

The present invention relates to a communication apparatus constituting a vehicle transmission system that transmits and receives data for realizing, in a train, a monitoring function and a control function of train-mounted devices.

BACKGROUND

The Non Patent Literature 1 listed below is a literature in which technical specifications related to a vehicle transmission system in a train are described.

Non Patent Literature 1 is a specification defining backbone transmission of an Ethernet® system for connecting vehicle formations, in order to realize interconnection between the vehicle formations of different manufacturers' vehicles. In this literature, as a technique of improving the reliability of the communication apparatus (ETBN: Ethernet® Train Backbone Node) that performs data communication between fixed formations, redundancy of ETBNs is described.

Also in Non Patent Literature 1, as a method for realizing redundancy of ETBNs, there is a description suggesting using the IETF (Internet Engineering Task Force) RFC (Request For Comments) 5798 VRRP (Virtual Router Redundancy Protocol).

When an ETBN is made redundant in accordance with the VRRP, an ETBN (ETBN Master) that operates as a master periodically transmits a frame for alive monitoring (VRRP Advertisement). Meanwhile, another ETBN (ETBN Backup) that operates as a backup determines that the ETBN operating as a master has malfunctioned if the ETBN Backup does not receive any frame for alive monitoring (hereinafter, "alive monitoring frame") for a predetermined time period, and the ETBN Backup itself becomes a master and starts to operate as a master.

For example, in Patent Literature 1, an invention is described that causes network devices to be redundant in accordance with the VRRP.

CITATION LIST

Patent Literature

Patent Literature 1: Japanese Patent Application Laid-open No. 2007-312091

Non Patent Literature

Non Patent Literature 1: IEC 61375 2-5

SUMMARY

Technical Problem

According to Non Patent Literature 1, a vehicle transmission system is configured to include branch networks (ECN: Ethernet Consist Networks) formed in fixed formations and a backbone network (ETB: Ethernet Train Backbone) that includes ETBNs and connects ECNs to each other. In the vehicle transmission system, devices belonging to different ECNs communicate with each other via the ETBNs and the ETB. The master ETBN, which is made redundant, transmits an alive monitoring frame to the backup via the ECN; therefore, the backup can detect whether the master has malfunctioned.

However, there has been a problem in that, in the ETBN operating as a backup, when a port connected to an ECN malfunctions, even if the ETBN operating as a master is normal, no alive monitoring frame can be received and thus it is determined that the ETBN operating as a master has malfunctioned, and the ETBN that has been operating as a backup inevitably starts to operate as a master. In this case, there is a problem in that frame discard occurs because the ETBN that has started to operate as a master inevitably relays a frame received from another ECN via the ETB to the malfunctioning port.

The present invention has been achieved in view of the above problems, and an object of the present invention is to improve the accuracy with which a malfunction on the master side is detected by the backup side of the redundant communication apparatus in a vehicle transmission system having a configuration in which a communication apparatus (ETBN) that connects a backbone network (ETB) and branch networks (ECN) is made redundant.

Solution to Problem

In order to solve the above problems and achieve the object, an aspect of the present invention is a communication apparatus that forms, in a train in which fixed formations are coupled to each other, a backbone network with another communication apparatus that is made redundant, the backbone network relaying signals between branch networks formed in the fixed formations, the apparatus including: an alive-monitoring-frame processing unit that, when the communication apparatus is operating as a master, periodically transmits an alive monitoring frame to the another communication apparatus operating as a backup via a branch network, and, when the communication apparatus is operating as a backup, receives an alive monitoring frame transmitted from the another communication apparatus operating as a master via a branch network; a port-malfunction detection unit that detects whether a port to which a branch network is connected has malfunctioned; and an alive determination unit that, when the communication apparatus is operating as a backup, detects whether the another communication apparatus operating as a master has malfunctioned on a basis of an alive-monitoring-frame reception result from the alive-monitoring-frame processing unit and a malfunction detection result from the port-malfunction detection unit.

Advantageous Effects of Invention

According to the present invention, an effect is obtained where a communication apparatus operating as a backup can accurately detect a malfunction of a communication apparatus operating as a master.

DESCRIPTION OF EMBODIMENTS

Exemplary embodiments of a communication apparatus according to the present invention will be described below in detail with reference to the accompanying drawings. The present invention is not limited to the embodiments.

Embodiment

The present embodiment describes communication apparatuses (ETBNs) in a vehicle transmission system, in which the communication apparatuses that relay signals between branch networks (ECNs) formed in different fixed formations are made redundant.

Problems with a conventional vehicle transmission system in which the ETBN is made redundant are described below in detail with reference to FIGS. 1 to 3.

Figure 1:
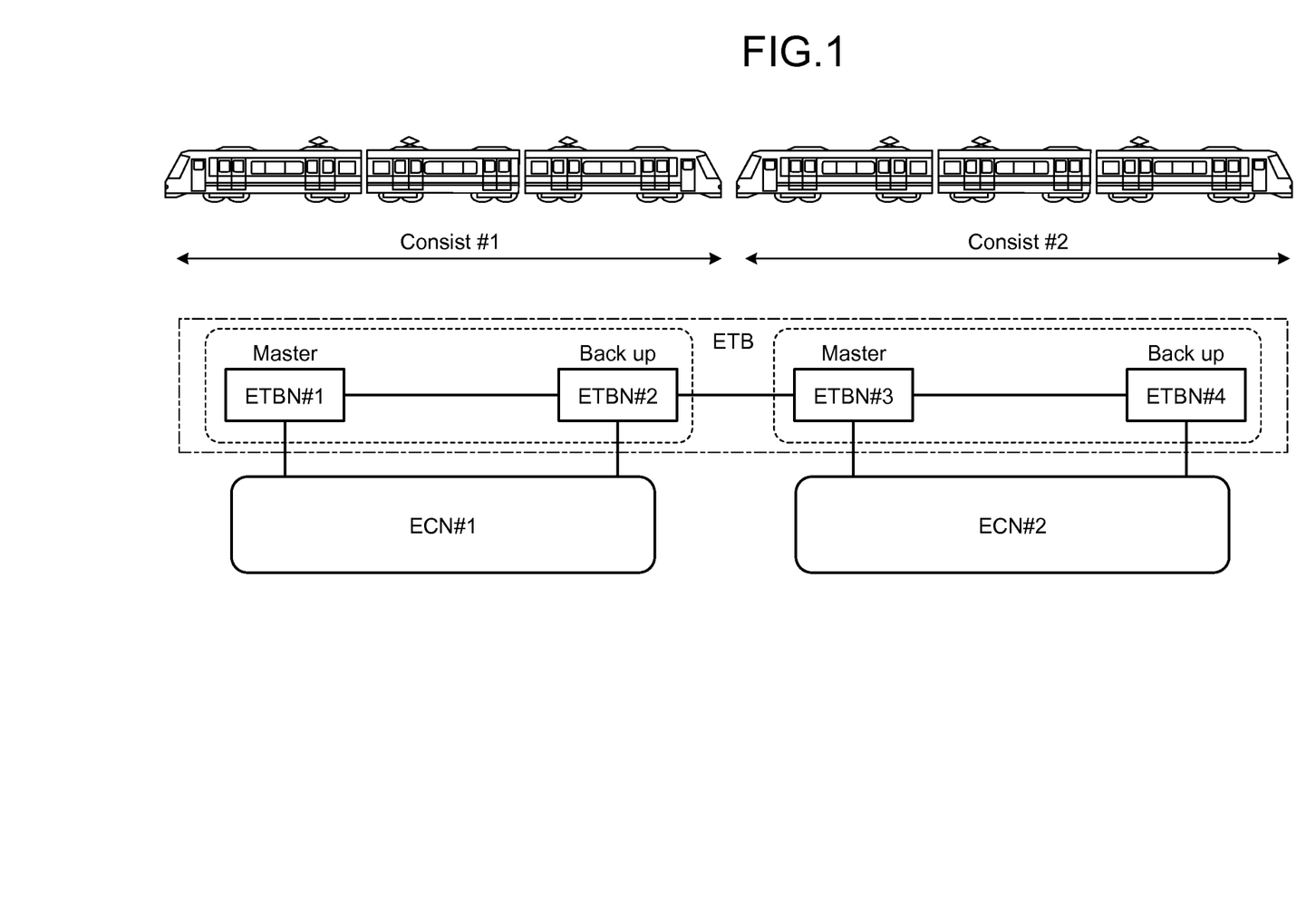
FIG. 1 is a diagram illustrating an example of a connection relation among ECNs, an ETB, and ETBNs constituting a vehicle transmission system.

FIG. 1 is a diagram illustrating an example of the connection relation among ECNs, an ETB, and ETBNs constituting a vehicle transmission system, and the correspondence relation between these elements and train formations is also illustrated.

An ECN #1 is formed in a fixed formation #1 (Consist #1), and an ECN #2 is formed in a fixed formation #2 (Consist #2). The ECNs #1 and #2 are connected to the ETB that is formed to cross between the fixed formations #1 and #2. In the fixed formation #1, an ETBN #1 and an ETBN #2 that relay signals between the ECN #1 and the ETB are provided. In the fixed formation #2, an ETBN #3 and an ETBN #4 that relay signals between the ECN #2 and the ETB are provided. Among these ETBNs, the ETBNs #1 and #3 operate as master ETBNs and the remaining ETBNs, which are ETBNs #2 and #4, operate as backup ETBNs. That is, due to the configuration in which one of the ETBNs connected to the same ECN operates as a master and the other one operates as a backup, a plurality (two in the configuration example in FIG. 1) of ETBNs connected to the same ECN theoretically work as one ETBN. Train-mounted devices (not illustrated, such as a central device for a train information management system, an air conditioner, a lighting device, and a brake device) are connected to the ECNs #1 and 2. Train-mounted devices connected to the same ECN communicate with each other via the ECN. Train-mounted devices connected to different ECNs communicate with each other via the ECNs and the ETB. In the case of the configuration example illustrated in FIG. 1, for example, when a first train-mounted device connected to the ECN #1 transmits data to a second train-mounted device connected to the ECN #2, the data transmission path is set as "the first train-mounted device→the ETBN #1→the ETBN #2,→the ETBN #3→the second train-mounted device". The ETBN #2 performs a relaying process of signals transmitted and received between the ETBNs #1 and 43 even when the ETBN #2 is operating as a backup.

Figure 2:
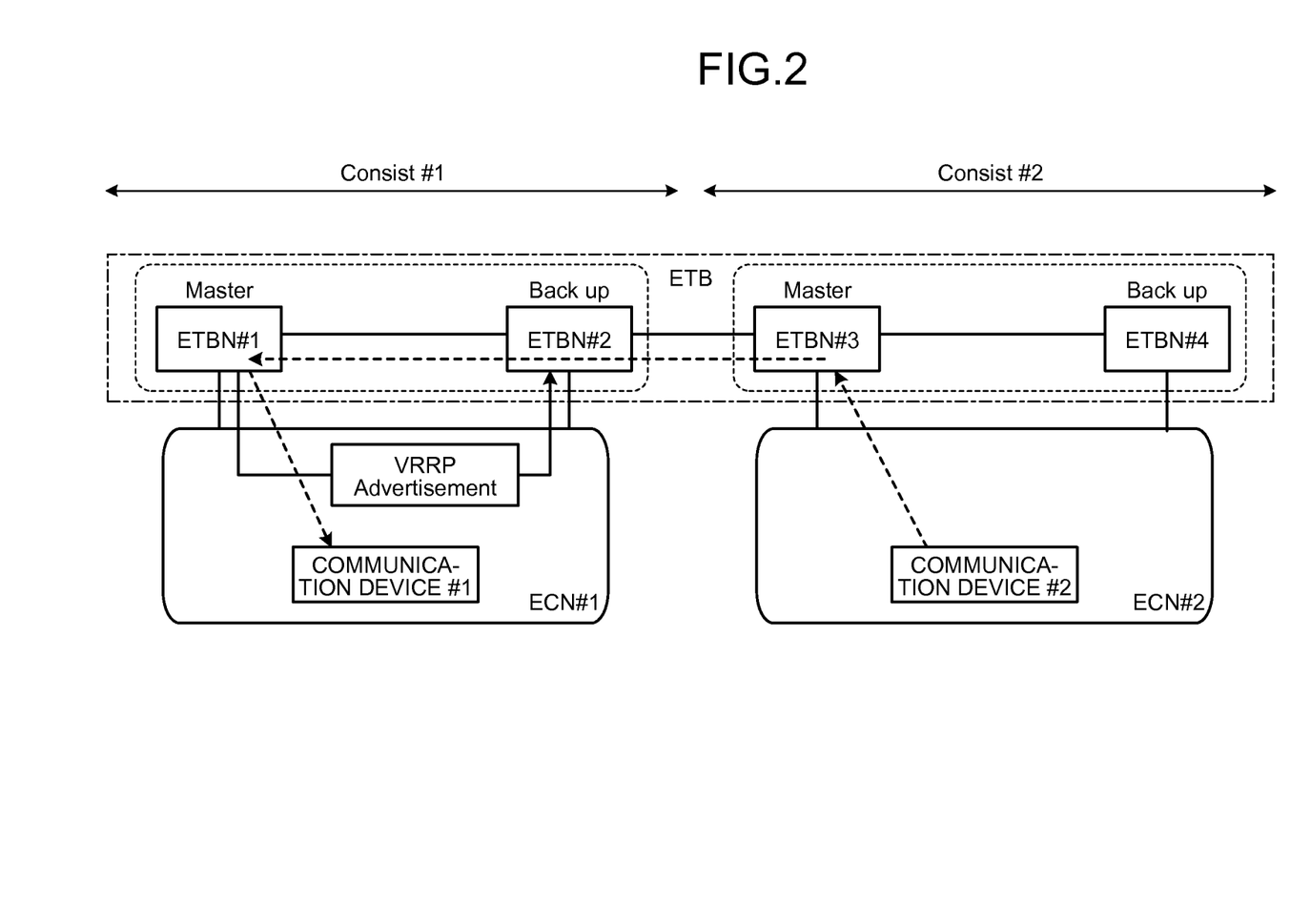
FIG. 2 is a diagram illustrating an operation example of ETBNs constituting a vehicle transmission system.

FIG. 2 is a diagram illustrating an operation example of the ETBNs constituting the vehicle transmission system illustrated in FIG. 1. As an example, operations of the ETBN #1 and the ETBN #2 are illustrated in FIG. 2. The ETBN #1 as a master (ETBN Master) transmits an alive monitoring frame (VRRP Advertisement) to the ETBN #2 as a backup (ETBN Backup) in a predetermined cycle (in units of seconds). For example, when the ETBN #1 has received a frame, which has been transmitted from the communication device #2 of the ECN #2 to the communication device #1 of the ECN #1, from the ETBN #3 (a master) on the ECN #2 side via the ETBN #2, the ETBN #1 relays the frame to the ECN #1. Conversely, when the ETBN #1 has received a frame transmitted from the communication device #1 to the communication device #2, the ETBN #1 relays the frame to the ETBN #3 via the ETBN #2. Meanwhile, the ETBN #2 operating as a backup determines whether the ETBN #1 is alive (whether the ETBN #1 is operating normally) by monitoring reception of an alive monitoring frame from the ETBN #1. Specifically, when no alive monitoring frame is received within a certain time period that is longer than a transmission period of the alive monitoring frame, it is determined that the ETBN #1 has malfunctioned. When the ETBN #2 is operating as a backup, the ETBN #2 does not perform any relaying process (relaying of signals from the ECN #1 to the ETB and relaying of signals from the ETB to the ECN #1) between the ECN #1 and the ETB. Note that the ETBN #2 performs relaying within the ETB, i.e., a relaying process between the ETBN #1 and the ETBN #3.

Figure 3:
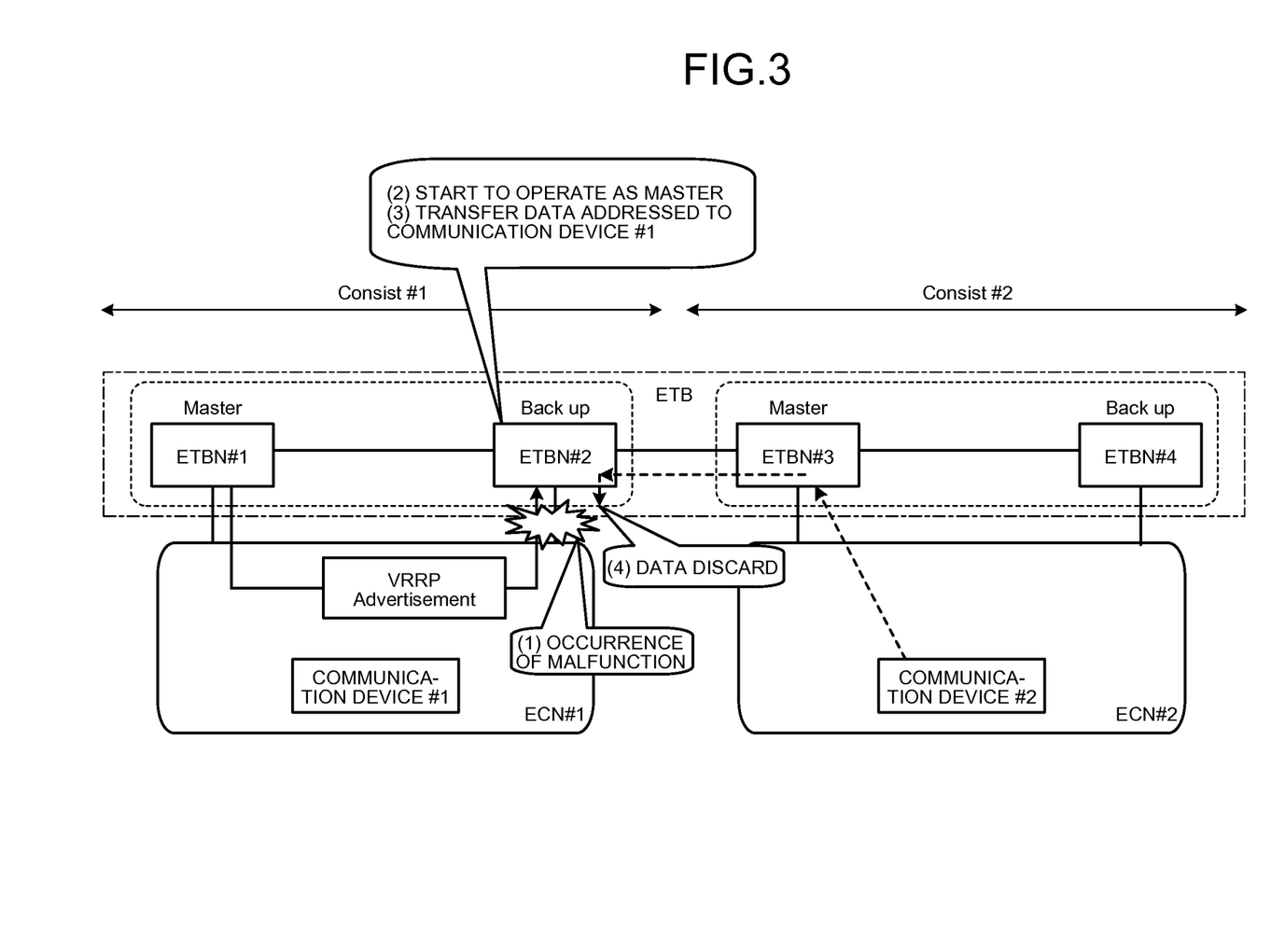
FIG. 3 is a diagram illustrating an example of problems in a conventional vehicle transmission system.

FIG. 3 is a diagram illustrating an example of problems in a conventional vehicle transmission system. As illustrated in FIG. 3, in the conventional vehicle transmission system, when a port to which the ECN #1 is connected has malfunctioned in the ETBN #2 operating as a backup ((1) occurrence of malfunction), an alive monitoring frame from the ETBN #1 cannot be received. As a result, when a predetermined time passes after the occurrence of the malfunction, the ETBN #2 starts to operate as a master. That is, when the ETBN #2 has received data, which has been transmitted from the communication device #2 of the ECN #2 to the communication device #1 of the ECN #1, from the ETBN #3, the ETBN #2 transfers the received data to the ECN #1 without relaying the data to the ETBN #1 ((2), (3)). However, because the port to which the ECN #1 is connected has malfunctioned, the data is discarded at the port (4).

As described above, in the conventional vehicle transmission device, in an ETBN operating as a backup, when a port to which an ECN is connected malfunctions, there has been a problem in that the ETBN inevitably starts to operate as a master. Furthermore, when the ETBN, in which a port to which an ECN is connected has malfunctioned, operates as a master, there has been a problem in that devices connected to different ECNs cannot communicate with each other.

Next, the vehicle transmission system according to the present embodiment that can solve the above problems is described.

Figure 4:
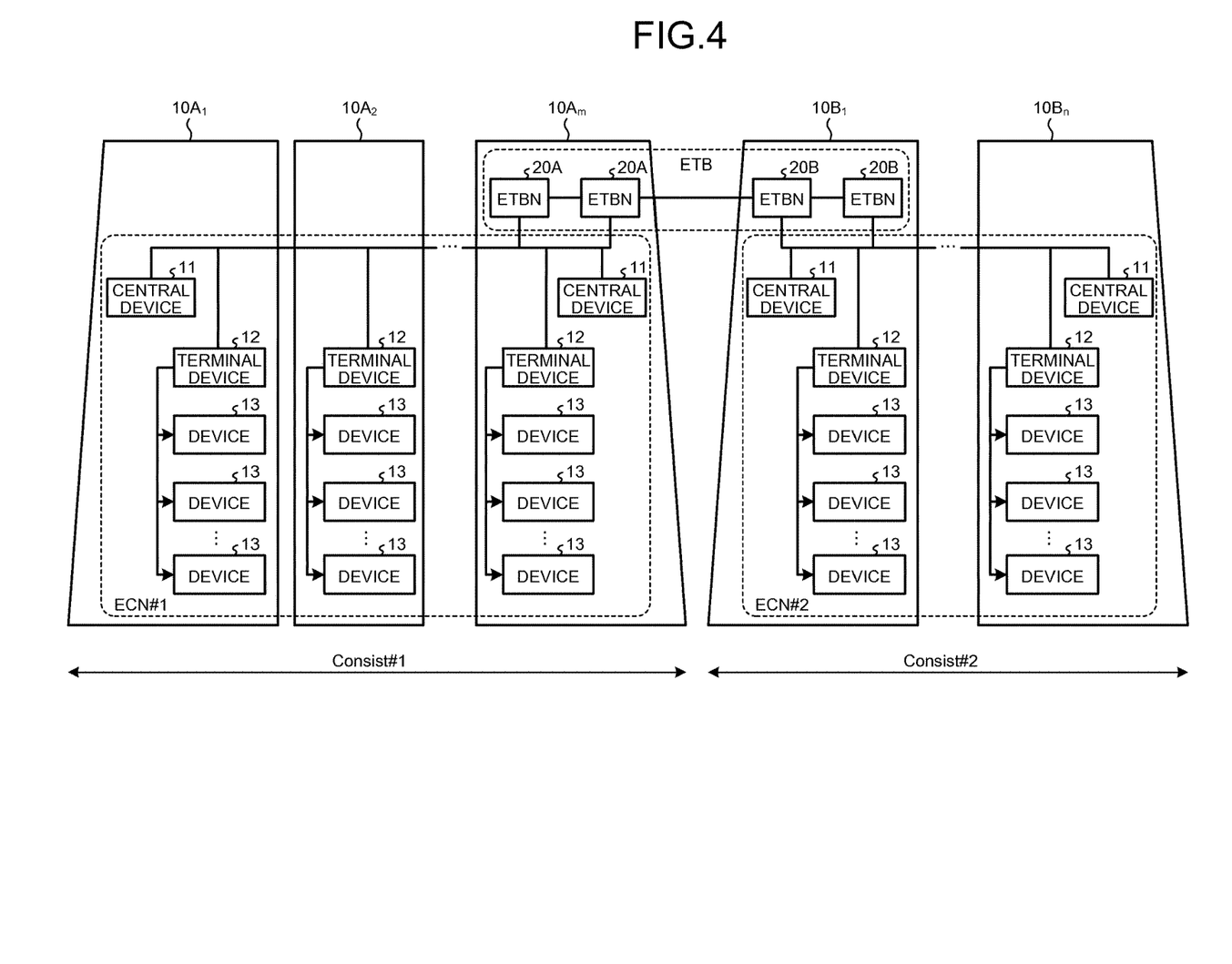
FIG. 4 is a diagram illustrating a configuration example of a train information management apparatus in which the vehicle transmission system according to the present invention is applied.

FIG. 4 is a diagram illustrating a configuration example of a train information management apparatus in which the vehicle transmission system according to the present invention is applied. The train information management apparatus illustrated in FIG. 4 includes various devices that are mounted on respective vehicles in a train in which the fixed formation #1 formed of vehicles $10A_1$ to $10A_m$ and the fixed formation #2 formed of vehicles $10B_1$ to $10B_n$ are coupled to each other. A terminal device 12 and a plurality of train-mounted devices 13 (hereinafter, "devices 13") are mounted on each of the vehicles, and a central device 11 is mounted on the head vehicles (the vehicles $10A_1$, $10A_m$, $10B_1$, and $10B_n$) of each of the fixed formations. The devices 13 are, for example, an air conditioner, a lighting device, a display device, and a brake device. ETBNs 20 (ETBNs 20A and 20B) as communication apparatuses according to the present invention are also mounted on the head vehicles (the vehicles $10A_m$ and $10B_1$) that are positioned in the middle of the train because the fixed formations #1 and #2 are coupled to each other. The ETBNs 20 form a backbone network (ETB) that connects the ECN #1 and the ECN #2. The ETBN 20 in each of the fixed formations is duplicated, and one of the ETBNs 20 operates as a master and the other one operates as a backup. The duplicated ETBNs 20 can be mounted on vehicles that are different from those illustrated in FIG. 4. Two ETBNs can be separately mounted on different vehicles. That is, it is satisfactory if the ETBN is duplicated in each of the fixed formations, and the mounting positions of the ETBNs are not particularly specified. Furthermore, in the present embodiment, while an example where the ETBN is duplicated is described, a configuration in which these ETBNs are made even more redundant can also be used. While the duplicated ETBNs 20 and the central device 11 are described as separate constituent elements in the present embodiment, these elements can be integrated.

The central device 11 is connected to a control operation device such as a master controller (not illustrated) and performs a process of inputting and outputting train information, such as train identification information, train position information, train operating information, and train command information.

Each of the terminal devices 12 transmits data including information such as control information output from the central devices 11 to the devices 13, and collects data output from the devices 13 and transmits the data to the central devices 11. In this manner, the terminal devices 12 cooperate with each other to collect and share train information. The data output from the devices 13 includes, for example, information indicating a transmission destination (the central device 11) of the data, device IDs for identifying the transmission source devices, and operation state information (such as a current air-conditioning temperature and an output from a VVVF) on the devices 13. Therefore, the central devices 11 having received the data from the devices 13 can identify which device the operation state information has been transmitted from.

When the ETBN 20 is operating as a master, it relays a signal received from an ECN to an ETB and relays a signal received from the ETB to the ECN. Furthermore, the ETBN 20 operating as a master periodically transmits an alive monitoring frame (VRRP Advertisement) to the ETBN 20 operating as a backup via the ECN. When the ETBN 20 is operating as a backup, it detects a malfunction of the ETBN 20 operating as a master on the basis of, for example, the reception result of an alive monitoring frame transmitted from the ETBN 20 operating as a master. The configuration may be such that detection is made as to whether the fixed formations are in the coupled state and the ETON 20 is caused to operate as either a master or a backup only when the fixed formations are coupled to each other. Due to this configuration, it is possible to prevent an increase in traffic within the ECN by avoiding unnecessary transmission of an alive monitoring frame and to reduce the power consumption of the ETBNs 20.

Operations of the train information management apparatus are briefly described with reference to FIG. 4. The central device 11 outputs data (hereinafter, "control command") including information such as individual device data (control data) for controlling operations of the devices 13 to the terminal devices 12. Each terminal device 12 having received the control command transfers the control command to the devices 13 connected to the terminal device 12 itself, and the devices 13 having received the control command perform operations corresponding to the individual device data included in the control command.

Meanwhile, data from the devices 13 including operation state information is collected in each terminal device 12 and transmitted to the central device 11. The central device 11 having received data from the devices 13 records the data therein and outputs the operation state information and the like to a display unit (not illustrated) provided in a cab or the like. As a result, information necessary for the train operation is displayed on the display unit.

Figure 5:
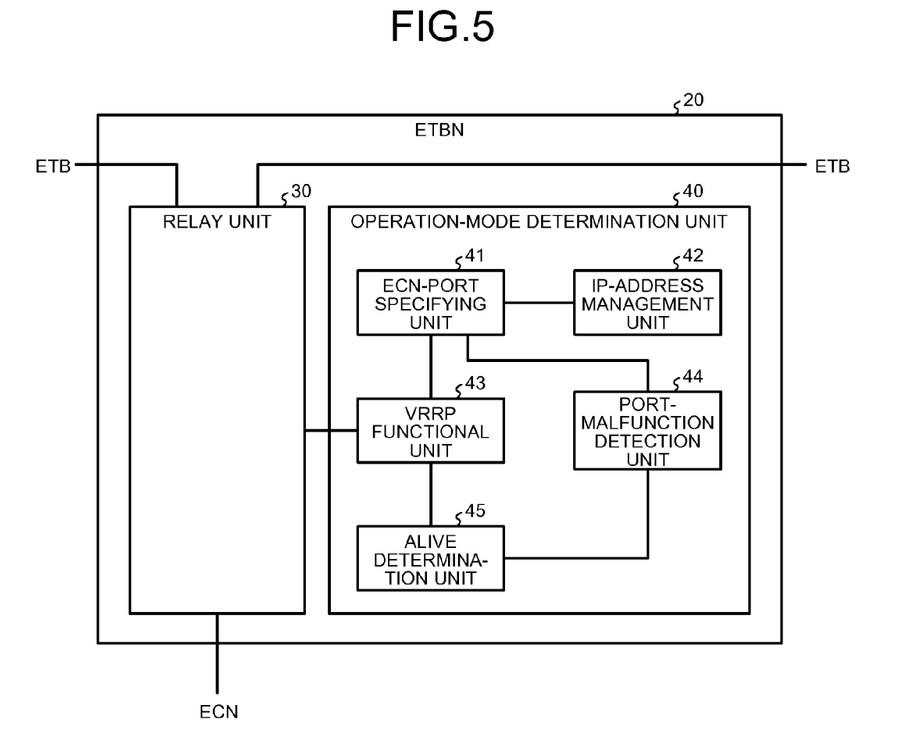
FIG. 5 is a diagram illustrating a configuration example of an ETBN.

Next, the ETBN 20 is described in detail. FIG. 5 is a diagram illustrating a configuration example of the ETBN 20. The ETBN 20 includes a relay unit 30 that relays signals between an ECN and an ETB and an operation-mode determination unit 40 that determines whether the corresponding ETBN operates as a master or a backup. The operation-mode determination unit 40 includes an ECN-port specifying unit 41, an IP-address management unit 42, a VRRP functional unit 43, a port-malfunction detection unit 44, and an alive determination unit 45.

When the operation-mode determination unit 40 determines that the ETBN operates as a master ETBN, upon reception of a frame from an ECN, the relay unit 30 checks whether the received frame is a VRRP frame (a frame having a format defined by a VRRP, hereinafter, "VRRP frame"). When the frame is a VRRP frame, the relay unit 30 relays the VRRP frame to the VRRP functional unit 43 in the operation-mode determination unit 40, and when it is a frame other than a VRRP frame, the relay unit 30 converts the frame into a frame having a format corresponding to the ETB and relays the frame to the ETB. When the relay unit 30 receives a frame from the ETB, the relay unit 30 converts the received frame into a frame having a format corresponding to the ECN and relays the frame to the ECN. Furthermore, the relay unit 30 receives an alive monitoring frame (VRRP Advertisement, a type of VRRP frame) that is periodically generated by the VRRP functional unit 43 and transmits the frame to the ECN. Meanwhile, when the operation-mode determination unit 40 determines that the corresponding ETBN operates as a backup ETBN, upon reception of a frame from an ECN, the relay unit 30 checks whether the received frame is a VRRP frame. When the frame is a VRRP frame, the relay unit 30 relays the frame to the VRRP functional unit 43 in the operation-mode determination unit 40, and when it is a frame other than a VRRP frame, the relay unit 30 discards the frame (the frame is not relayed to an ETB). Further, when the relay unit 30 receives, from an ETB, a frame that is addressed to a different ETBN, the relay unit 30 transfers the frame to that different ETBN.

The operation-mode determination unit 40 determines whether the corresponding ETBN operates as a master or a backup and notifies the relay unit 30 of the determination result. The operation-mode determination unit 40 also performs operations according to the determination result.

In the operation-mode determination unit 40, the ECN-port specifying unit 41 specifies an ECN port, which is a physical port to which an ECN is connected, from among a plurality of physical ports, on the basis of a correspondence table of physical ports and IP addresses, which is managed by the IP-address management unit 42.

The IP-address management unit 42 manages information (a correspondence table of physical ports and IP addresses)

on IP addresses assigned to respective physical ports included in the corresponding ETBN.

The VRRP functional unit 43, which operates as an alive-monitoring-frame processing unit, executes control conforming to the VRRP (Virtual Router Redundancy Protocol) between other ETBNs, which theoretically work as one ETBN.

The port-malfunction detection unit 44 detects whether an ECN port has a malfunction. The method of detecting a malfunction is not particularly specified.

The alive determination unit 45 determines whether the ETBN operating as a master is operating normally when the corresponding ETBN is operating as a backup.

Figure 6:
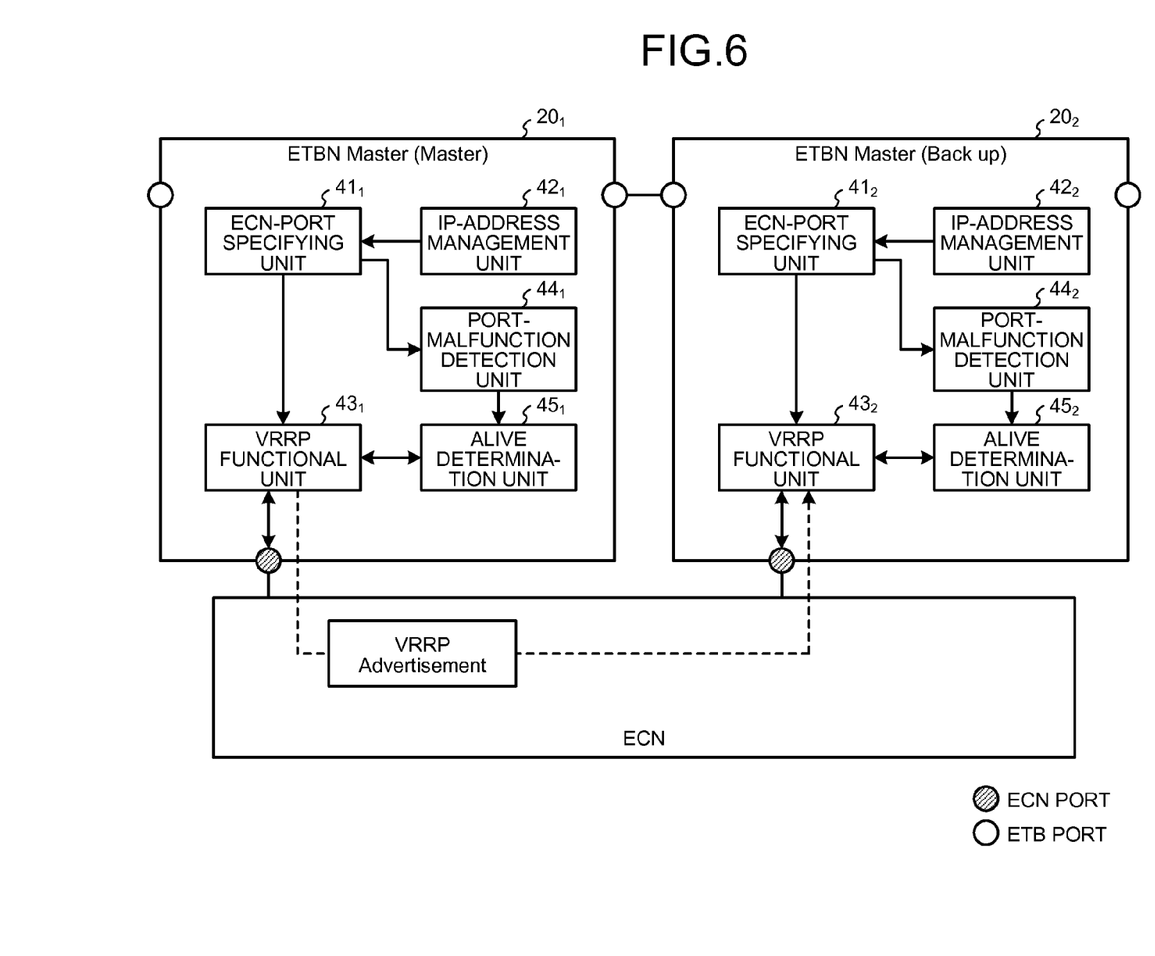
FIG. 6 is a diagram for explaining a characteristic operation of an ETBN.

Explanation will be given, with reference to FIG. 6, of the characteristic operations of the ETBN 20 according to the present embodiment, specifically, operations performed by the ETBN 20 operating as a backup in order to detect a malfunction of the ETBN 20 operating as a master, as well as other operations related to these operations. In FIG. 6, it is assumed that an ETBN $20_1$ operates as a master, an ETBN $20_2$ operates as a backup, and these ETBNs theoretically work as one ETBN. In FIG. 6, only constituent elements (corresponding to the respective constituent elements in the operation-mode determination unit 40 illustrated in FIG. 5) necessary for performing the characteristic operations are illustrated.

When the ETBN $20_1$ starts operating, an ECN-port specifying unit $41_1$ of the ETBN $20_1$ refers to the correspondence table of physical ports and IP addresses, which is managed by an IP-address management unit $42_1$, and specifies a physical port (hereinafter, "ECN port") to which an ECN is connected. In this case, the range of IP addresses, which are assigned to devices that perform communication by using ECNs, are defined as 10.128.64.0/18 to 10.143.0.0/18 in Non Patent Literature 1 (IEC 61375 2-5) listed above. Accordingly, the ECN-port specifying unit $41_1$ determines a physical port to which an IP address within the range is assigned as an ECN port. After specifying of the ECN port is completed, the ECN-port specifying unit $41_1$ notifies a VRRP functional unit $43_1$ and a port-malfunction detection unit $44_1$ of the specification result (the physical port corresponding to the ECN port).

Similarly, when the ETBN $20_2$ starts operating, an ECN-port specifying unit $41_2$ of the ETBN $20_2$ specifies an ECN port. The ECN-port specifying unit $41_2$ then notifies a VRRP functional unit $43_2$ and a port-malfunction detection unit $44_2$ of the specification result.

When the specifying process of an ECN port by the ECN-port specifying unit $41_1$ is finished, the VRRP functional unit $43_1$ of the ETBN $20_1$ performs a predetermined procedure according to the VRRP and determines that the ETBN $20_1$ operates as a master. Meanwhile, when the specifying process of an ECN port by the ECN-port specifying unit $41_2$ is finished, the VRRP functional unit $43_2$ of the ETBN $20_2$ performs a predetermined procedure according to the VRRP and determines that the ETBN $20_2$ operates as a backup.

In the ETBN $20_1$, which has started to operate as a master, the VRRP functional unit $43_1$ periodically generates an alive monitoring frame (VRRP Advertisement) and transmits the generated frame to the ECN port via a relay unit (not illustrated).

Meanwhile, in the ETBN $20_2$, which has started to operate as a backup, the VRRP functional unit $43_2$ receives an alive monitoring frame transmitted from the VRRP functional unit $43_1$ on the master side. Each time the VRRP functional unit $43_2$ receives an alive monitoring frame, the VRRP functional unit $43_2$ notifies an alive determination unit $45_2$ that an alive monitoring frame has been received.

The port-malfunction detection unit $44_2$ monitors whether an ECN port specified by the ECN-port specifying unit $41_2$ malfunctions.

Figure 7:
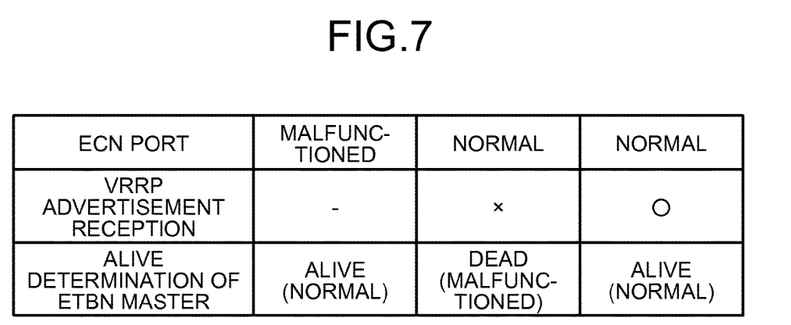
FIG. 7 is a table illustrating a malfunction determination method performed on an ETBN Master.

The alive determination unit $45_2$ detects whether an ETBN Master (the ETBN $20_1$ operating as a master) has malfunctioned on the basis of the reception result of an alive monitoring frame from the VRRP functional unit $43_2$ and the monitoring result from the port-malfunction detection unit $44_2$. Specifically, if no alive monitoring frame is received for a predetermined time period (no alive monitoring frame is transmitted from the ETBN Master) even when the corresponding ECN port is in a normal state, the ETBN Master is determined to have malfunctioned (see FIG. 7). When the ECN port has malfunctioned, it is assumed that the ETBN Master is operating normally. When a malfunction of the ETBN Master is detected, the alive determination unit $45_2$ notifies the VRRP functional unit $43_2$ that a malfunction of the ETBN Master is detected. In the VRRP, the predetermined time period is defined as Master_Down_Interval.

When the VRRP functional unit $43_2$ is notified of the malfunction detection of the ETBN Master (the ETBN $20_1$) from the alive determination unit $45_2$, the VRRP functional unit $43_2$ determines that the ETBN $20_2$ is to start operating as a master. Subsequently, the VRRP functional unit $43_2$ instructs a relay unit (not illustrated) to start operating as a master (i.e., to start an operation of relaying signals between the ECN and the ETB), and the VRRP functional unit $43_2$ itself also starts operating as a master (an operation of periodically generating an alive monitoring frame and transmitting the generated frame).

In this manner, according to the present embodiment, when a redundant ETBN in a vehicle transmission system operates as a backup, the ETBN monitors the reception state of an alive monitoring frame transmitted from a master via an ECN and the state of an ECN port (whether the ECN port has malfunctioned), and when no alive monitoring frame is received in a state where the ECN port has not malfunctioned, the ETBN determines that the master ETBN has malfunctioned and starts an operation as a master ETBN. This means that it is possible to reduce the possibility of the ETBN operating as a backup erroneously detecting a malfunction of the ETBN operating as a master. Furthermore, it is possible to solve the problem where, when an ECN port has malfunctioned, an ETBN having operated as a backup starts to operate as a master and thus devices connected to different ECNs cannot communicate with each other.

The present embodiment describes a case where redundancy of communication apparatuses is realized by using the VRRP; however, if it is a system that realizes redundancy by an active unit (a master) periodically transmitting an alive monitoring frame and a standby unit (a backup) detecting a malfunction of the active unit by using the transmitted frame, the system can also be applicable to the present embodiment.

INDUSTRIAL APPLICABILITY

As described above, the communication apparatus according to the present invention is useful for a vehicle transmission system, and is particularly suitable as a communication apparatus that, in a train in which a plurality of fixed formations are coupled to each other, relays signals between branch networks formed in the fixed formations.

REFERENCE SIGNS LIST $10A_1$ to $10A_m$, $10B_1$ to $10B_n$ vehicle, 11 central device, 12 terminal device, 13 train-mounted device, 20, 20A, 20B, $20_1$, $20_2$ ETBN, 30 relay unit, 40 operation-mode determination unit, 41, $41_1$, $41_2$ ECN-port specifying unit, 42, $42_1$, $42_2$ IP-address management unit, 43, $43_1$, $43_2$ VRRP functional unit, 44, $44_1$, $44_2$ port-malfunction detection unit, 45, $45_1$, $45_2$ alive determination unit.

The invention claimed is:

1. A communication apparatus that forms, in a train in which fixed formations are coupled to each other, a network formed in a fixed formation with another communication apparatus that is made redundant, the communication apparatus comprising:

an interface configured to interact with the another communication apparatus; and a network node, wherein, when the communication apparatus is operating as a backup, the network node is configured to generate an alive-monitoring-frame reception result based on an alive monitoring frame transmitted from the another communication apparatus operating as a master and received via the network node;

wherein the network node is configured to generate a port malfunction detection result based on detecting whether a port to which the network is connected has malfunctioned;

wherein, when the communication apparatus is operating as a backup, the network node is configured to detect whether the another communication apparatus operating as a master has malfunctioned on a basis of the alive-monitoring-frame reception result and the port malfunction detection result; and wherein, responsive to the port malfunction detection result indicating a malfunction of the port to which the network is connected, the network node is configured to determine that the another communication apparatus is operating normally.

2. The communication apparatus according to claim 1, wherein the network node is further configured to determine that a malfunction of the another communication apparatus has occurred when the network node does not receive an alive monitoring frame for a predetermined time period in a state where the network node is not detecting a malfunction of the port to which the network is connected.

3. The communication apparatus according to claim 1, wherein when the communication apparatus is operating as a master, the communication apparatus operates as an ETBN defined in IEC 61375 2-5.

4. A vehicle transmission system having a configuration in which, in a train in which fixed formations are coupled to each other, a communication apparatus that forms a network formed in a fixed formation with another communication apparatus that is made redundant, wherein the communication apparatus includes an interface configured to interact with the another communication apparatus; and a network node, wherein, when the communication apparatus is operating as a backup, the communication apparatus is configured to generate an alive-monitoring-frame reception result based on an alive monitoring frame transmitted from the another communication apparatus operating as a master and received via the network node, wherein the network node is configured to generate a port malfunction detection result based on detecting whether a port to which the network is connected has malfunctioned, wherein, when the communication apparatus is operating as a backup, the network node is configured to detect whether the another communication apparatus operating as a master has malfunctioned on a basis of the alive-monitoring-frame reception result and the port malfunction detection result, and wherein, responsive to the port malfunction detection result indicating a malfunction of the port to which the network is connected, the network node is configured to determine that the another communication apparatus is operating normally.

5. The vehicle transmission system according to claim 4, wherein the network node is further configured to determine that a malfunction of the another communication apparatus has occurred when the network node does not receive an alive monitoring frame for a predetermined time period in a state where the network node is not detecting a malfunction of the port to which the network is connected.

6. The vehicle transmission system according to claim 4, wherein when the communication apparatus is operating as a master, the communication apparatus operates as an ETBN defined in IEC 61375 2-5.

* * * * *